US008238699B2

(12) United States Patent
Allouche

(10) Patent No.: US 8,238,699 B2
(45) Date of Patent: Aug. 7, 2012

(54) SEMICONDUCTOR-BASED OPTICAL TRANSCEIVER

(75) Inventor: David Allouche, Belmont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/368,930

(22) Filed: Mar. 6, 2006

(65) Prior Publication Data

US 2006/0198571 A1    Sep. 7, 2006

Related U.S. Application Data

(60) Provisional application No. 60/658,558, filed on Mar. 4, 2005.

(51) Int. Cl.
*G02B 6/12* (2006.01)
*H04B 10/00* (2006.01)

(52) U.S. Cl. .......... 385/14; 398/128; 398/135; 398/138; 398/139

(58) Field of Classification Search ........................ None
See application file for complete search history.

(56) References Cited

U.S. PATENT DOCUMENTS

| | | | | |
|---|---|---|---|---|
| 4,499,607 A | * | 2/1985 | Higgins | 398/164 |
| 5,123,065 A | * | 6/1992 | Enochs | 385/9 |
| 5,198,684 A | * | 3/1993 | Sudo | 257/79 |
| 5,280,191 A | * | 1/1994 | Chang | 257/712 |
| 5,291,571 A | * | 3/1994 | Kunikane et al. | 385/93 |
| 5,357,122 A | * | 10/1994 | Okubora et al. | 257/84 |
| 5,432,630 A | * | 7/1995 | Lebby et al. | 398/116 |
| 5,502,785 A | * | 3/1996 | Wang et al. | 385/92 |
| 5,521,992 A | * | 5/1996 | Chun et al. | 385/14 |
| 5,652,811 A | * | 7/1997 | Cook et al. | 385/14 |
| 5,708,743 A | * | 1/1998 | DeAndrea et al. | 385/88 |
| 5,978,401 A | * | 11/1999 | Morgan | 372/50.21 |
| 6,021,947 A | * | 2/2000 | Swartz | 235/472.01 |
| 6,353,264 B1 | * | 3/2002 | Coronel et al. | 257/777 |
| 6,466,613 B1 | * | 10/2002 | Raphaeli et al. | 375/219 |
| 6,477,286 B1 | * | 11/2002 | Ouchi | 385/14 |
| 6,508,595 B1 | * | 1/2003 | Chan et al. | 385/92 |
| 6,592,269 B1 | * | 7/2003 | Brophy et al. | 385/92 |
| 6,771,846 B2 | * | 8/2004 | Byers et al. | 385/14 |
| 6,963,119 B2 | * | 11/2005 | Colgan et al. | 257/432 |
| 7,013,088 B1 | * | 3/2006 | Jiang et al. | 398/139 |
| 7,030,486 B1 | * | 4/2006 | Marshall | 257/712 |
| 7,068,881 B2 | * | 6/2006 | Yoo | 385/31 |
| 2002/0041741 A1 | * | 4/2002 | Ciemiewicz | 385/89 |
| 2003/0053736 A1 | * | 3/2003 | Kuhara | 385/14 |
| 2003/0086644 A1 | * | 5/2003 | Bhalla et al. | 385/24 |
| 2003/0148613 A1 | * | 8/2003 | Ahn et al. | 438/689 |
| 2004/0076113 A1 | * | 4/2004 | Aronson et al. | 370/217 |
| 2004/0197046 A1 | * | 10/2004 | Drost et al. | 385/14 |
| 2005/0058408 A1 | * | 3/2005 | Colgan et al. | 385/89 |
| 2005/0135727 A1 | * | 6/2005 | Piede et al. | 385/14 |
| 2005/0281528 A1 | * | 12/2005 | Watanabe | 385/135 |
| 2006/0045530 A1 | * | 3/2006 | Lim et al. | 398/135 |
| 2007/0248359 A1 | * | 10/2007 | Pamart et al. | 398/135 |
| 2008/0285590 A1 | * | 11/2008 | Mizuno et al. | 370/466 |

* cited by examiner

*Primary Examiner* — Uyen Chau N Le
*Assistant Examiner* — Chris Chu
(74) *Attorney, Agent, or Firm* — Maschoff Gilmore & Israelsen

(57) ABSTRACT

A semiconductor-based optical transceiver. The optical transceiver includes a post-amplifier that may communicate with an optoelectronic transducer, an electro-optic transducer driver that may communicate with an electro-optic transducer, and a control module that controls the operation of the post-amplifier and electro-optic transducer driver. The control module, the post-amplifier, and the electro-optic transducer driver are integrated in a single integrated circuit (IC) that does not require a printed circuit board for interconnecting these components of the optical transceiver.

26 Claims, 5 Drawing Sheets

SEMICONDUCTOR-BASED OPTICAL TRANSCEIVER

CROSS-REFERENCE TO RELATED APPLICATIONS

This application claims the benefit of U.S. Provisional Application No. 60/658,558, filed Mar. 4, 2005, which is incorporated herein by reference in its entirety.

BACKGROUND

1. The Field of the Invention

The embodiments disclosed herein relate generally to optical transceivers. More specifically, the embodiments disclosed herein relate to semiconductor-based optical transceivers that do not use a printed circuit board (PCB) for interconnections between components of the optical transceiver.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver may also include a sensing photodiode for monitoring the output of the optical transmitter.

The optical transceiver also generally includes an amplifier (e.g., often referred to as a "post-amplifier") configured to perform various operations with respect to certain parameters of a data signal received by the optical receiver. A TransImpedance Amplifier (TIA) may be implemented to amplify signals received from the optical receiver. A controller circuit (hereinafter referred to as the "controller") controls the operation of the laser driver and post amplifier.

The various components of the optical transceiver are often implemented as one or more integrated circuits or discrete components that are interconnected using a PCB. The use of the PCB to interconnect the various ICs and discrete components, however, is often expensive and time consuming during manufacture of the transceiver as each IC or component must be individually mounted to the PCB.

In addition, individual optical transceivers are often enclosed in some type of encasing or packaging for protection. The use of a PCB board to interconnect the ICs and other components of the optical transceiver, however, often makes it so that the packaging or encasing of the transceiver may potentially be larger, which may cause space problems in a host computing system coupled to the optical transceivers.

BRIEF SUMMARY

Embodiments disclosed herein relate to a semiconductor-based optical transceiver. The optical transceiver includes a post-amplifier that may communicate with an optoelectronic transducer, an electro-optic transducer driver that may communicate with an electro-optic transducer, and a control module that controls the operation of the post-amplifier and electro-optic transducer driver. The control module, the post-amplifier, and the electro-optic transducer driver are integrated in a single integrated circuit (IC) that does not require a printed circuit board for interconnecting these components of the optical transceiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments of the present invention extend to a semiconductor-based optical transceiver. The optical transceiver includes various components that are integrated as a single integrated circuit (IC) without the use of a printed circuit board (PCB) for interconnecting the components. In some embodiments, the optical transceiver includes a post-amplifier that may communicate with an optoelectronic transducer such as a photodiode, an electro-optic transducer driver that may communicate with an electro-optic transducer such as a laser, and a control module that controls the operation of the post-amplifier and electro-optic transducer driver, all integrated upon the same semiconductor die. In other embodiments, the optical transceiver may further include a TransImpedance Amplifier (TIA), an optoelectronic transducer such as a photodiode, a sense photodiode, and/or an electro-optic transducer all integrated and/or mounted on the same semiconductor die.

Figure 1:
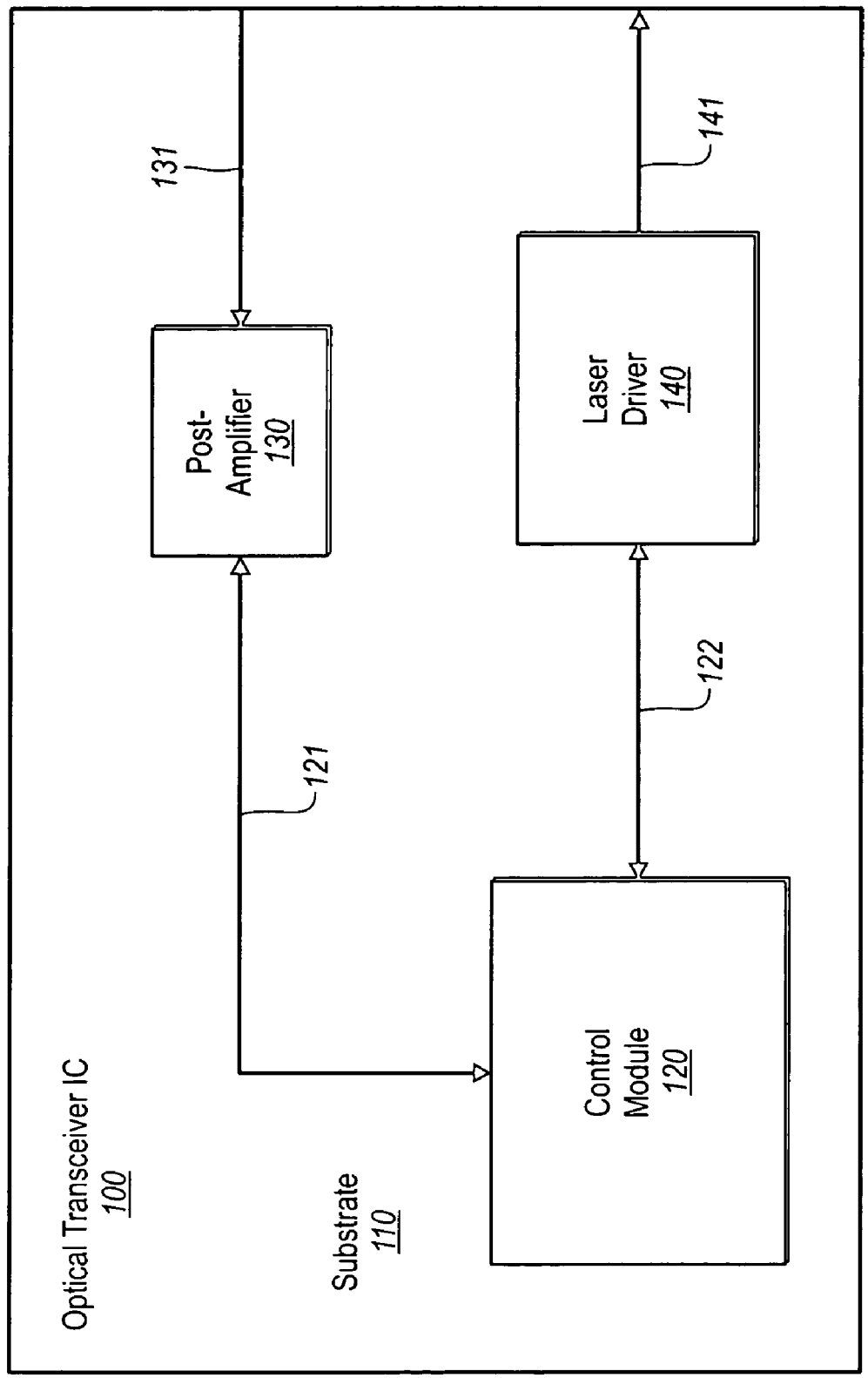
FIG. 1 illustrates an example optical transceiver IC in accordance with embodiments disclosed herein.

Turning first to FIG. 1, an optical transceiver IC 100 is illustrated. Optical transceiver IC 100 may be configured to include several different components that are directly integrated or mounted onto a substrate 110 of the optical transceiver IC 100. The components may be interconnected using electrical interconnections that are also directly integrated onto the substrate 110. Accordingly, optical transceiver IC 100 need not use a PCB for interconnections between the components that are included on the single integrated circuit die. In some embodiments, optical transceiver IC 100 may be coupled to a host computing system that controls the operation of the optical transceiver. Optical transceiver IC 100 may be able to support 1G, 2G, 4G, 8G, 10G and higher bandwidth fiber optic links. Furthermore, optical transceiver IC 100 may be able to support transmitter/receivers of any form factor such as XFP, SFP and SFF, without restriction.

As mentioned, optical transceiver IC 100 includes a substrate 110. Substrate 110 may be any reasonable substrate known in the art such as silicon or silicon germanium. In some embodiments, substrate 110 may also be gallium arsenide or indium phosphate. Note that the exact material of substrate 100 will often be determined by the types of components that are integrated onto the substrate and the process used to integrate the components. The embodiments disclosed herein contemplate using different substrates as circumstances warrant.

As mentioned, various components, which will be described in more detail to follow, are integrated or mounted directly onto substrate 110. These components may be integrated onto substrate 110 by any known semiconductor fabrication process. Examples of well-known semiconductor fabrication processes include photo lithography processes, etching processes, and growth processes. In some embodiments, the components may be fabricated using a complementary metal-oxide semiconductor process (CMOS) and/or a bipolar complementary metal-oxide semiconductor process (BiCMOS), both of which may be more cost effective than other processes, although that is not required. Advantageously, fabricating the components of the optical transceiver IC 100 onto substrate 110 may cause lower power dissipation when the optical transceiver is operated.

Substrate 110 also includes electrical interconnections (described below) between the various components that are also directly integrated onto the substrate. These electrical connections may be directly integrated onto substrate 110 by any semiconductor fabrication process known in the art. Advantageously, directly integrating the interconnections onto substrate 110 allows for interconnections without the use of a PCB.

In addition, directly integrating the interconnections onto substrate 110 may allow for increased performance. For example, because the interconnections are necessarily close together, they are less susceptible to undesirable parasitic elements such as distributed capacitance and inductance. In addition, the close proximity of the interconnections helps to reduce cross-talk and Electro-Magnetic Interference (EMI). The interconnections may also be fabricated using less expensive processing as a result of their close proximity.

Although not illustrated in FIG. 1 (or in any of the subsequent figures) optical transceiver IC 100 will be enclosed in some type of packing when implemented. The packaging is used to protect the components and interconnections integrated onto substrate 110. The packaging may include various connections that are used to connect the components of optical transceiver IC 100 with components and systems external to the IC 100. These connections may be lead frames, pins, ball gird arrays, or any type of IC external connection known in the art.

Returning to FIG. 1, in one embodiment, optical transceiver IC 100 includes a post-amplifier 130, an electro-optic transducer driver 140 and a control module 150 that are directly integrated onto substrate 110. Since lasers are in common usage, an electro-optic transducer driver 140 may also be referred to as a "laser driver" to reflect this common usage.

In operation, post-amplifier 130 is configured to communicate with an optoelectronic transducer. Specifically, post-amplifier 130 receives an electrical signal from an optoelectronic transducer such as a photodiode using interconnection 131. The post-amplifier 130 amplifies the signal and provides the amplified signal to the host computing system. As mentioned above, interconnection 131 is directly integrated onto substrate 110. The optoelectronic transducer may be external to optical transceiver IC 100. In such cases, optical transceiver IC 100 may have an external interconnection (not illustrated) to facilitate connection with the optoelectronic transducer as mentioned previously.

Laser driver 140 is configured to communicate with an electro-optic transducer such as a laser or a Light Emitting Diode (LED). Specifically, laser driver 140 receives an electrical signal from a host computing system and drives the electro-optical transducer using interconnection 141 with signals that cause the electro-optical transducer to emit optical signals representative of the information in the electrical signal provided by the host. Interconnection 141 is also directly integrated onto substrate 110. In embodiments where the electro-optical transducer is external to optical transceiver IC 100, an external connection may be implemented as discussed previously.

In some embodiments, laser driver 140 is DC coupled to the electro-optic transducer. The laser driver may have a single ended output stage or a differential output stage as circumstances warrant. DC coupling of the laser driver to the electro-optic transducer helps to ensure that both components may be directly integrated onto substrate 110.

The behavior of post-amplifier 130 and the laser driver 140 may vary dynamically due to a number of factors. For example, temperature changes, power fluctuations, and feedback conditions may each affect the performance of these components. Accordingly, the optical transceiver IC 100 may include a control module 120. Control module 120 is configured to monitor the operation of the post-amplifier 130 and the laser driver 140 using interconnections 121 and 122 respectively. In addition, control module 120 may provide control signals to and receive signals from the post-amplifier 130 and the laser driver 140 also using interconnections 121 and 122. Control module 120 may include general purpose processing capabilities and therefore optical transceiver IC 100 may be considered a computing device. As with the other interconnections previously discussed, interconnections 121 and 122 are directly integrated onto substrate 110.

Figure 2:
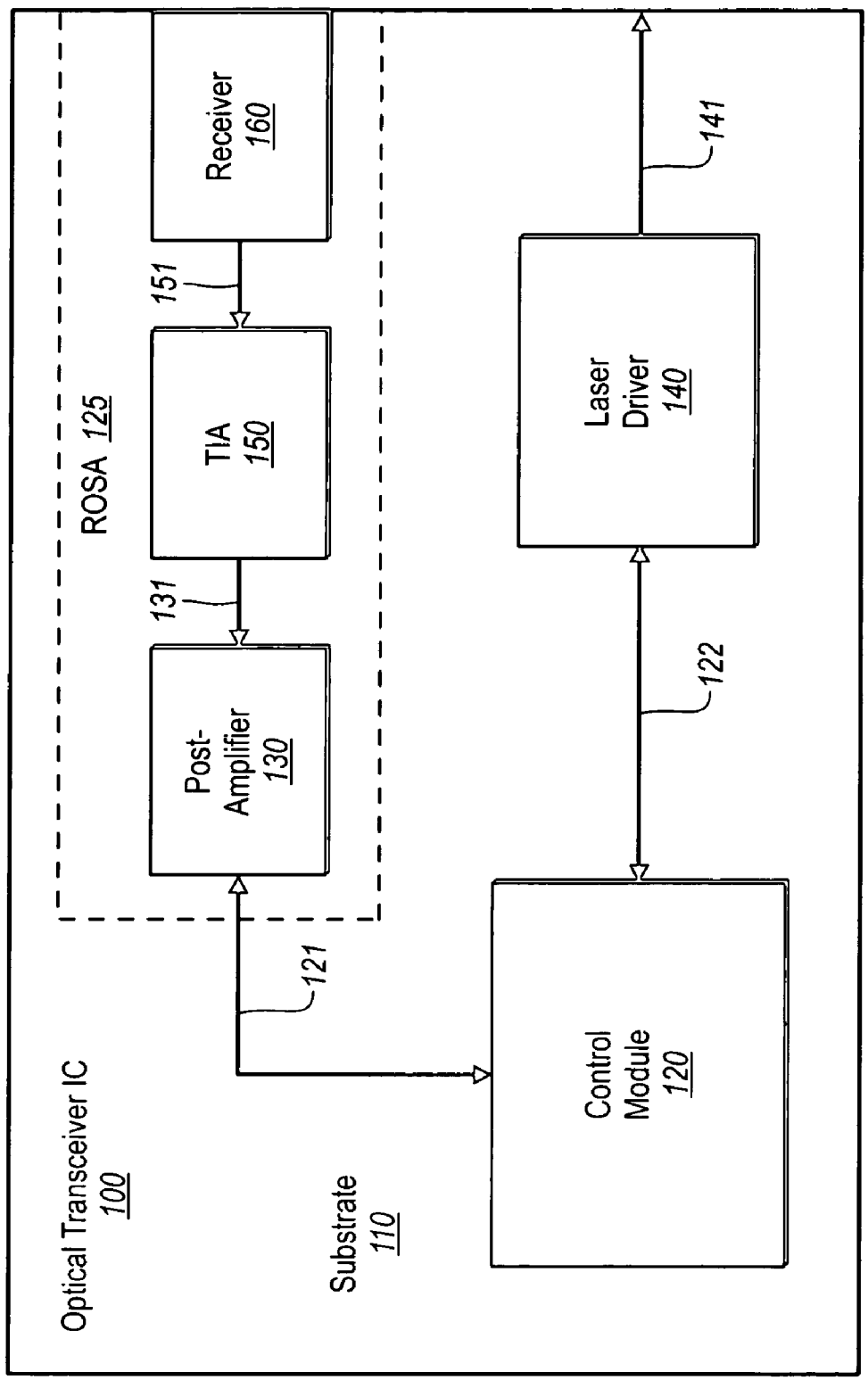
FIG. 2 illustrates another embodiment of the optical transceiver IC of FIG. 1.

Turning now to FIG. 2, another embodiment of optical transceiver IC 100 is depicted. The embodiment of FIG. 2 includes a Receive Optical SubAssembly (ROSA) 125. ROSA 125 may include post-amplifier 130, TransImpedance Amplifier (TIA) 150 and an optoelectronic transducer 160 or any combination of these three components as circumstances warrant. Note that hereinafter, an optoelectronic transducer will also be referred to simply as a "receiver" 160 for simplicity. The embodiment of FIG. 2 also includes the components previously described in relation to FIG. 1.

As illustrated, post-amplifier 130 is coupled to TIA 150 using interconnection 131. TIA 150 is configured to receive an electrical signal from receiver 160 using interconnection 160 and to provide amplification and impendence matching of the signal prior to providing the signal to the post-amplifier 130. In some embodiments, TIA 150 is directly integrated onto substrate 110 by any known semiconductor fabrication process in similar manner to the components discussed in relation to FIG. 1. In such embodiments, interconnection 151, which is directly integrated onto substrate 110, would be coupled to an external interconnection if receiver 160 were implemented external to optical transceiver IC 100.

In other embodiments, however, TIA 150 may first be fabricated on a separate substrate by any known fabrication process. TIA 150 may then be directly mounted onto substrate 110 by any mounting process known in the art in such a way that TIA 150 and post-amplifier 130 are interconnected. In this way, TIA 150 is still integrated onto optical transceiver IC 100 without the need for a PCB to interconnect the components.

In some embodiments, receiver 160 may be coupled to post-amplifier 130 either indirectly through a TIA or directly. The receiver 160, which may be a photodiode, acts as an optoelectronic transducer by transforming a received optical signal into an electrical signal. Receiver 160 may be directly integrated onto substrate 110 by any known semiconductor fabrication process in similar manner to the components discussed in relation to FIG. 1. Receiver 160 may be coupled to the post-amplifier 130 by interconnections 131 and 151, which are also directly integrated onto substrate 110 as previously discussed.

As with TIA 150, receiver 160 may be first fabricated on a separate substrate by any known fabrication process. Receiver 160 may then be directly mounted onto substrate 110 by any mounting process known in the art in such a way that receiver 160 is interconnected with TIA 150 and/or post-amplifier 130. Note that in this description and in the claims, a component that is first fabricated on a separate substrate that is then subsequently mounted onto substrate 110 is considered directly integrated with the other components of substrate 110 into a single integrated IC.

In further embodiments, both TIA 150 and receiver 160 may first be fabricated onto a separate substrate by any process known in the art. In such a case, interconnection 151 would also be part of this substrate. The combination of the TIA 150 and receiver 160 could then be mounted directly onto substrate 110 by any mounting process known in the art. The mounted combination of the TIA 150 and receiver 160 would then connect with post-amplifier 130 using interconnection 131.

Figure 3:
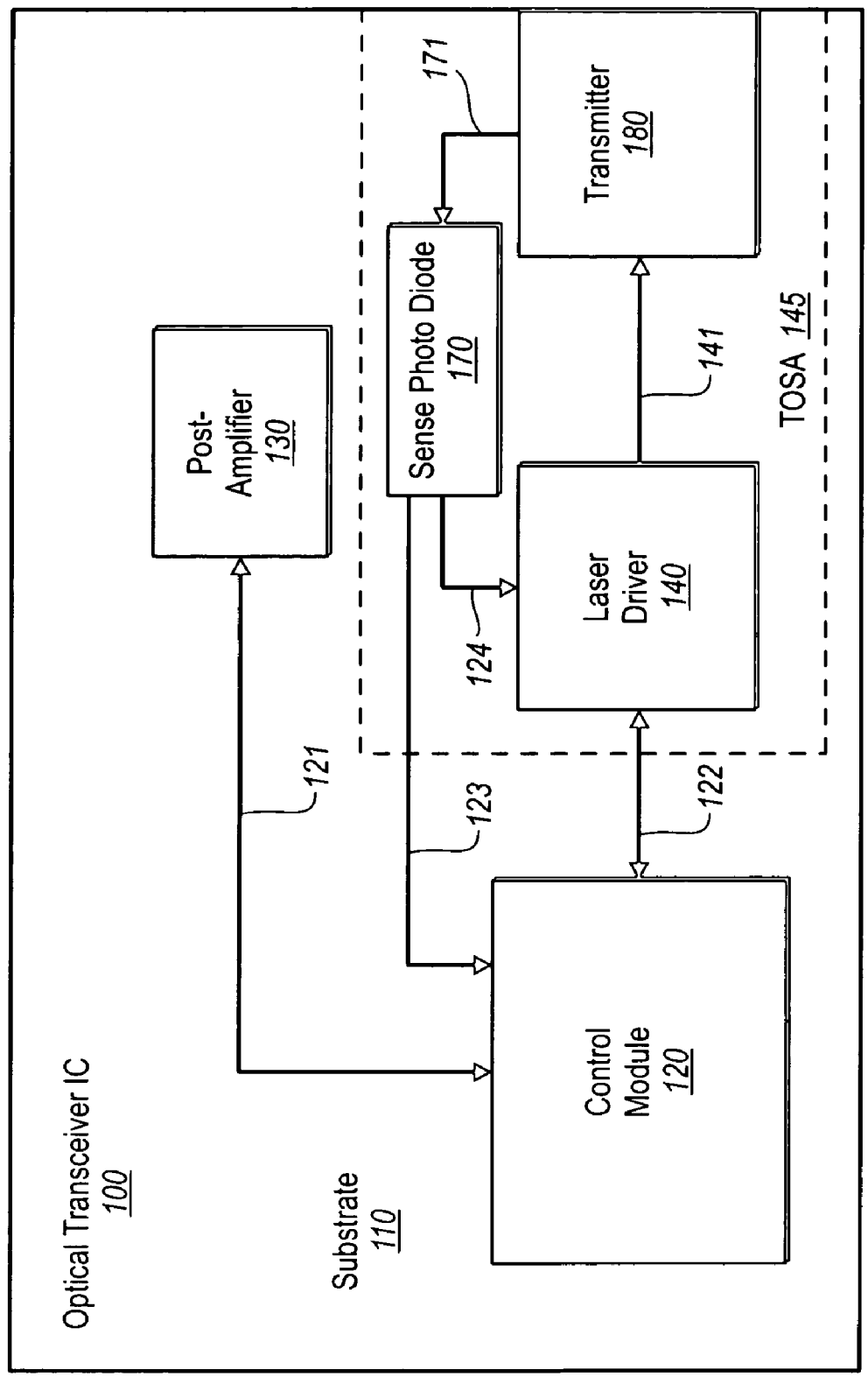
FIG. 3 illustrates an a further embodiment of the optical transceiver IC of FIG. 1.

Turning now to FIG. 3, a further embodiment of optical transceiver IC 100 is depicted. The embodiment of FIG. 3 includes a Transmit Optical SubAssembly (TOSA) 145. TOSA 145 may include laser driver 140, sense photodiode 170, and electro-optic transducer 180 or any combination of these three components as circumstances warrant. Note that hereinafter, an electro-optic transducer will also be referred to simply as a "transmitter" 180 for simplicity. The embodiment of FIG. 3 also includes the components previously described in relation to FIG. 1.

As illustrated, sense photodiode 170 is connected to control module 120 and laser driver 140 using interconnection 123 and interconnection 124 respectively. As with the other interconnections, interconnections 123 and 124 are directly integrated onto substrate 110. Sense photodiode 170 is configured to monitor the performance of transmitter 180 using interconnection 171 and to provide this information to control module 120 and/or laser driver 140. In some embodiments, sense photodiode is directly integrated onto substrate 110 by any known semiconductor fabrication process in similar manner to the components discussed in relation to FIG. 1. In such embodiments, interconnection 171, which is directly integrated onto substrate 110, would be coupled to an external interconnection if transmitter 180 were implemented external to optical transceiver IC 100.

In other embodiments, sense photodiode 170 may be first fabricated on a separate substrate by any known fabrication process. Sense photodiode 170 may then be directly mounted onto substrate 110 by any process known in the art. In this way, sense photodiode 170 is still integrated onto optical transceiver IC 100 without the need for a PCB to interconnect with other components.

Transmitter 180 may be coupled to laser driver 140. The transmitter 180, which may be a laser diode or LED, receives electrical drive signals from laser driver 140 over interconnection 141 that cause transmitter 180 to transmit optical signal representative of the information in the electrical drive signals. Transmitter 180 may be directly integrated onto substrate 110 by any known semiconductor fabrication process in similar manner to the components discussed in relation to FIG. 1.

Transmitter 180 may also be first fabricated on a separate substrate by any known fabrication process. Transmitter 180 may then be directly mounted onto substrate 110 by any process known in the art in such a way that transmitter 180 is interconnected with laser driver 140 and sense photodiode 170.

In further embodiments, both sense photodiode 170 and transmitter 180 may first be fabricated onto a substrate by any process known in the art. In such a case, interconnection 171 would also be part of this substrate. The combination of the sense photodiode 170 and transmitter 180 may then be directly mounted onto substrate 110 by any mounting process known in the art. The mounted combination of the sense photodiode 170 and transmitter 180 would then connect with laser driver 140 and control module 120 using interconnections 123, 124 and/or 141.

Figure 4:
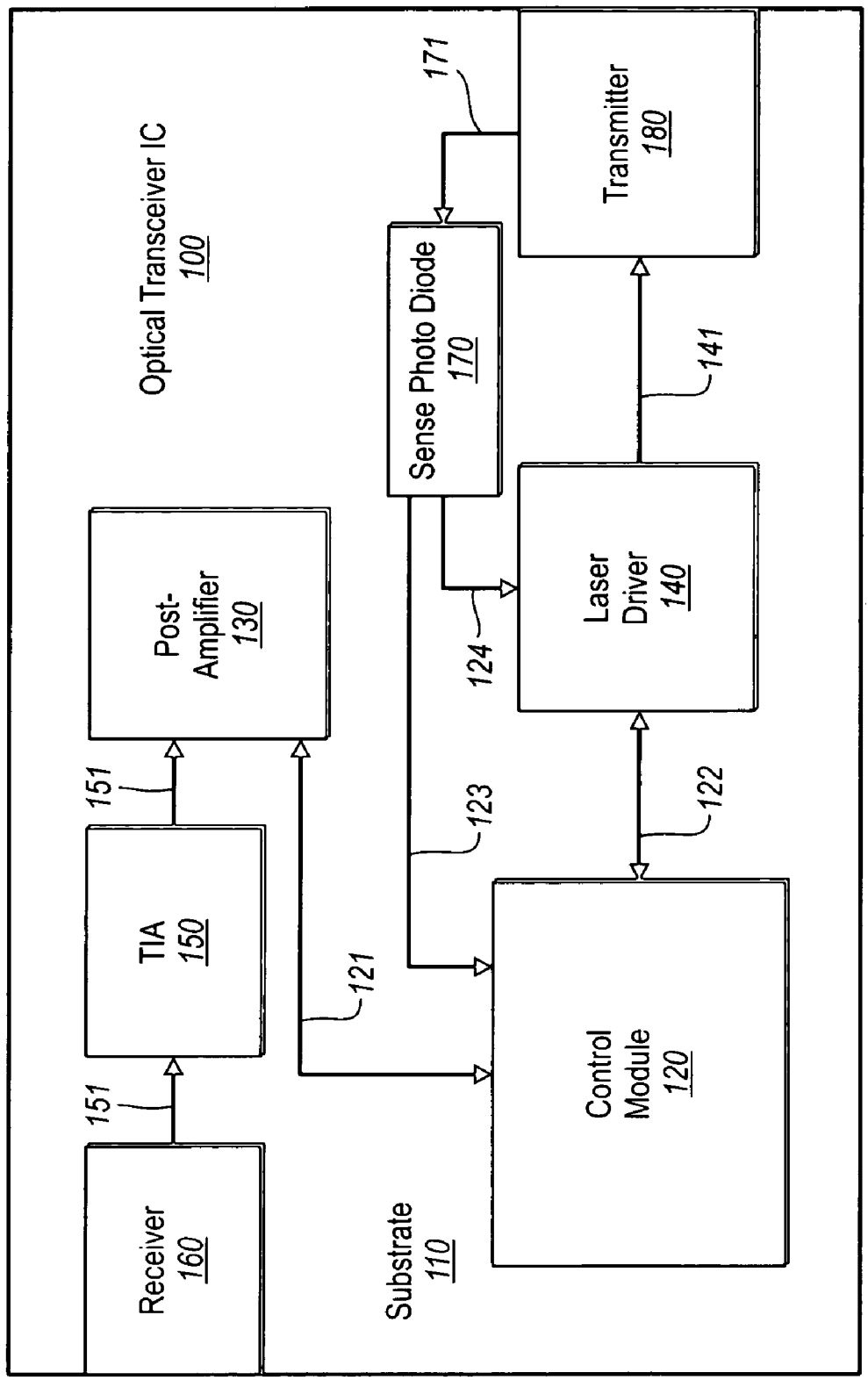
FIG. 4 illustrates an additional embodiment of the optical transceiver IC of FIG. 1.

Turning now to FIG. 4, an additional embodiment of optical transceiver IC 100 is illustrated. The embodiment of FIG. 4 includes all of the components previously discussed in relation to FIGS. 1-3, although the relative positions of some of the components on substrate 110 is illustrated differently. As previously discussed, the various components and interconnections of FIG. 4 may be directly integrated onto substrate 110 by any semiconductor fabrication process known in the art such that a PCB board is not required for interconnecting the components. In some embodiments, TIA 150 and/or receiver 160 may be first fabricated onto a separate substrate that is then directly mounted onto substrate 110 as previously described. In like manner, sense photodiode 170 and/or transmitter 180 may also be first fabricated onto a separate substrate that is then directly mounted onto substrate 110 as previously described.

Note that FIG. 4 (and the proceeding figures) are drawn for ease of illustration and are not necessarily drawn to actual scale or perspective. Accordingly, the embodiments where components such as receiver 160 and transmitter 180 are first fabricated on a separate substrate and then directly mounted onto substrate 110 may not be explicitly illustrated. A box is simply drawn to represent all the various embodiments of the various components. However, as has been previously mentioned, the principles of the present invention contemplate both directly integrating components onto substrate 110 and directly mounting components previously fabricated on separate substrate onto substrate 110, both of which may be considered as integrated onto a single IC without the use of a PCB for interconnections. In addition, the relative position of the various components in the figures is for ease of illustration only. The principles of the present invention contemplate different locations for the various components on substrate 110. Accordingly, the actual physical layout of the components on substrate 110 should not be used to limit the embodiments disclosed herein unless explicitly stated.

Although FIG. 4 illustrates all of the various components previously described, the embodiments disclosed herein also contemplate various different groupings of the components. For example, in one embodiment optical transceiver IC 100 may include control module 120, post-amplifier 130, laser driver 140, TIA 150, receiver 160, and transmitter 180. In this embodiment, the various components may be fabricated as previously described. In addition, TIA 150 and/or receiver 160 may be fabricated onto a separate substrate that is then directly mounted onto substrate 110 as previously described.

In another embodiment, optical transceiver IC 100 may include control module 120, post-amplifier 130, laser driver 140, receiver 160, sense photo diode 170 and transmitter 180. In this embodiment, the various components may be fabricated as previously described. In addition, sense photodiode 170 and/or transmitter 180 may also be fabricated onto a separate substrate that is then directly mounted onto substrate 110 as previously described. There may also be other groupings of components as circumstances warrant.

Figure 5:
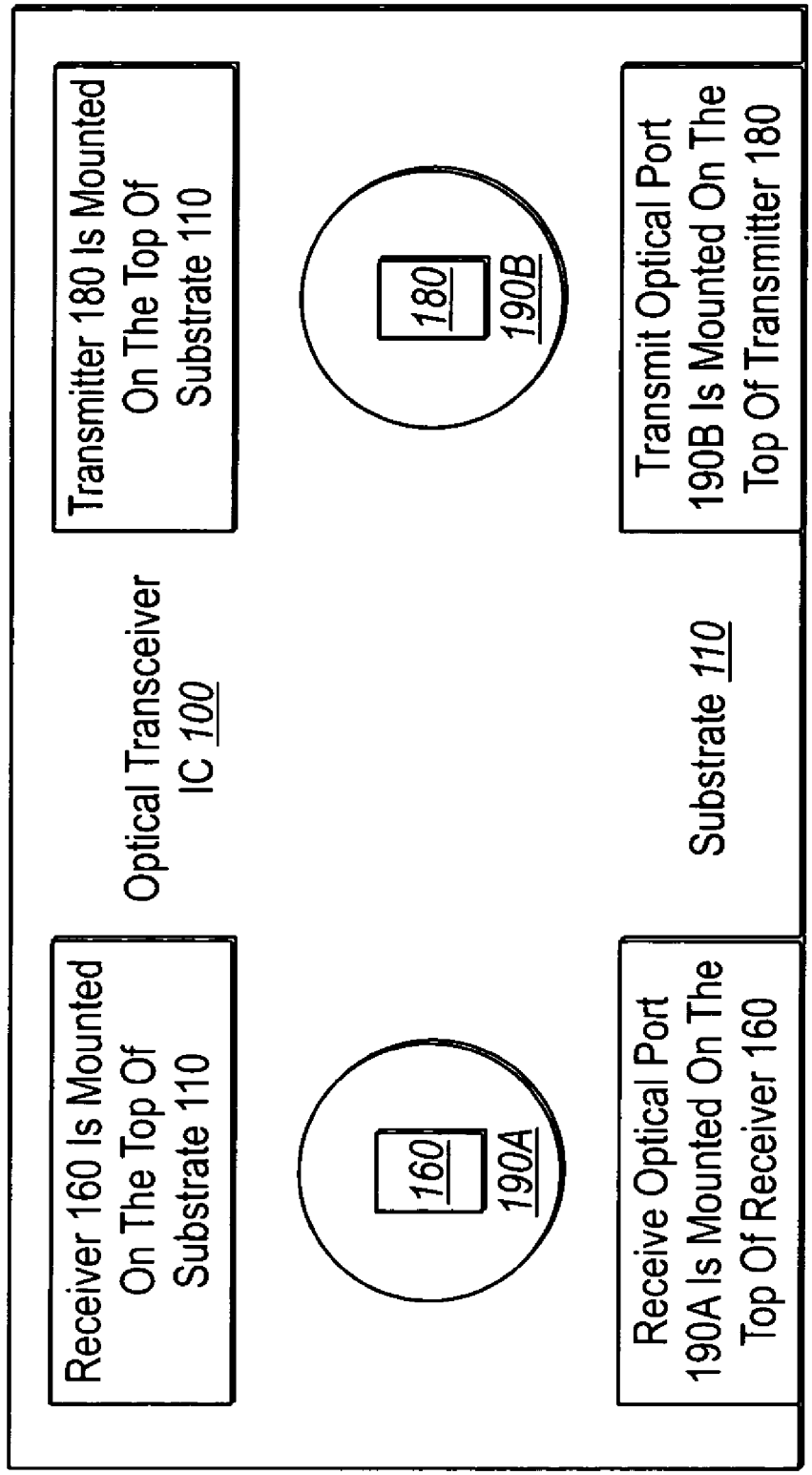
FIG. 5 illustrates an embodiment of optical ports mounted on an optical transceiver IC.

Referring now to FIG. 5, an example embodiment of a receive optical port 190A and a transmit optical port 190B are illustrated. Optical ports 190 represent the physical interface between optical transceiver IC 100 and any optical fibers that are used to transmit optical signals from optical transceiver IC 100 and transmit optical signals to transceiver 100. Optical ports 190 may be bonded to optical transceiver IC 100 in any way known in the art that will produce the required connection. In the illustrated embodiment, receiver 160 and transmitter 180 are directly mounted onto the top of substrate 110 as has been previously described. Receive optical port 190A, which is illustrated by a circle surrounding receiver 160, is then mounted on top of receiver 160 by any process known in the art. In like manner, transmit optical port 190B, which is illustrated by a circle surrounding transmitter 180, is mounted on top of transmitter 180. In some embodiments, both of the optical ports 190 may be aligned on the x-axis of IC 100 as this advantageously allows for ease of manufacture and connection to an optical fiber. Note, however, that other alignments are also contemplated by the embodiments disclosed herein.

Although not illustrated in FIGS. 1-4, optical transceiver IC 100 may include other components such as capacitors as circumstance warrant. For example, in some embodiments AC capacitors in the range of 2000 pF may be implemented to provide required capacitance in the transceiver. These particular capacitors advantageously will fit in the limited space of transceiver IC 100.

In some embodiments, optical transceiver IC 100 may be part of a multiple cell design. In such a design, one optical transceiver such as optical transceiver IC 100 may be fabricated by any process known in the art on top of another optical transceiver, which in turn may have another optical transceiver fabricated on top of it, the resulting product being integrated into a single IC. Accordingly, any number of optical transceivers may be fabricated into a single IC as part of the multiple cell design. Advantageously, this design allows for parallel processing by using the different cells for different communication links. For example, one cell may be configured to operate at 1 Gigabit per second (Gbps) while another cell was configured to operate at 2 Gbps and so on.

Accordingly, the principles of the present invention relate to a semiconductor only optical transceiver. The components of the optical transceiver and corresponding interconnections are directly integrated onto a semiconductor substrate, thus forming an integrated IC. Advantageously this removes the need to implement a PCB for interconnecting the components of the optical transceiver. As a result, manufacturing time and associated costs may be lowered as well known semiconductor fabrication processes may be implemented to fabricate the optical transceiver ICs. In addition, the overall size of the optical transceiver may be lowered. Further, directly integrating the components and interconnects as an IC may cause lower power dissipation and lower parasitic signal problems. Accordingly, the principles of the present invention are a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. An optical transceiver integrated circuit (IC) comprising:
    a single IC substrate having multiple cells integrated on the single IC substrate and the multiple cells being vertically arranged with respect to each other and to the single IC substrate, each cell being optically isolated from each other cell with at least one cell being configured to operate at one bitrate and at least another cell being configured to operate an another, different bitrate, each cell including:
        an optoelectronic transducer on an optoelectronic transducer substrate and being optically coupled to an optoelectronic transducer optical port that is configured to be operably coupled to a first optical fiber of a network, the optoelectronic transducer substrate being mounted on the IC substrate; and
        an electro-optic transducer on an electro-optic transducer substrate and being optically coupled to an electro-optic transducer optical port that is configured to be operably coupled to a second optical fiber of the network, the electro-optic transducer substrate being mounted on the IC substrate;
    a post-amplifier integrated on the IC substrate and configured for communication with the optoelectronic transducer;

an electro-optic transducer driver integrated on the IC substrate and configured for communication with the electro-optic transducer; and a control module integrated on the IC substrate and configured to control the operation of at least one of the electro-optic transducer driver and the post-amplifier, wherein the optoelectronic transducer substrate, the electro-optic transducer substrate, the post-amplifier, the electro-optic transducer driver, and the control module are integrated together and the optoelectronic transducer substrate is a separate substrate from the electro-optic transducer substrate, and the optical transceiver IC is devoid of a printed circuit board (PCB).

2. The optical transceiver IC in accordance with claim 1, each cell further comprising:

one or more optical receive ports directly mounted onto the optoelectronic transducer, wherein the one or more optical receive ports are configured as a physical interface with one or more optical fibers configured to transmit optical signals to the optoelectronic transducer; and one or more optical transmit ports directly mounted onto the electro-optic transducer, wherein the one or more optical transmit ports are configured as a physical interface with one or more optical fibers configured to transmit optical signals from the electro-optic transducer.

3. The optical transceiver IC in accordance with claim 1, each cell further comprising:

a transimpedance amplifier (TIA) configured for communication with the post-amplifier, wherein the TIA of each cell is integrated on the IC substrate and does not use a PCB for interconnection with the post-amplifier.

4. The optical transceiver IC in accordance with claim 1, each cell further comprising:

a sense photo-diode configured for communication with the control module, wherein the sense photo-diode of each cell is integrated on the IC substrate and does not use a PCB for interconnection with the control module.

5. The optical transceiver IC in accordance with claim 1, each cell further comprising:

a TIA on the optoelectronic transducer substrate and coupled to the optoelectronic transducer, the TIA further being coupled to the post-amplifier, wherein the optoelectronic transducer and the TIA of each cell do not use a PCB for interconnections with other components in the cell.

6. The optical transceiver IC in accordance with claim 1, each cell further comprising:

a sense photodiode on the electro-optic transducer substrate and coupled to the electro-optic transducer, wherein the electro-optic transducer and the sense photodiode of each cell do not use a PCB for interconnections with other components in the cell.

7. The optical transceiver IC in accordance with claim 1, each cell further comprising:

a sense photodiode coupled to the electro-optic transducer driver, wherein the sense photodiode of each cell is integrated on the IC substrate without the use of a PCB for interconnection between components of the cell.

8. The optical transceiver IC in accordance with claim 1, each cell further comprising:

a TIA coupled to the post-amplifier and the optoelectronic transducer, wherein the TIA of each cell is integrated on the IC substrate without the use of a PCB for interconnection between components of the cell.

9. The optical transceiver IC in accordance with claim 1, each cell further comprising:

a TIA coupled to the post-amplifier and the optoelectronic transducer; and a sense photodiode coupled to the electro-optic transducer;

wherein the TIA and the sense photodiode of each cell are integrated on the IC substrate without the use of a PCB for interconnection between components of the cell.

10. The optical transceiver IC in accordance with claim 1, wherein the optical transceiver IC is configured for parallel processing where each cell of the multiple cells operates at a different data rate.

11. A computing device used in optical communications comprising:

a Transmit Optical SubAssembly (TOSA);

a Receiver Optical SubAssembly (ROSA); and a control module configured to control the operation of the TOSA and the ROSA;

wherein the TOSA and the ROSA are integrated together on the single integrated circuit (IC) of claim 1 without the use of a printed circuit board (PCB).

12. The computing device in accordance with claim 11, wherein the ROSA includes a post-amplifier that does not use a PCB to interconnect with other components of the computing device.

13. The computing device in accordance with claim 12, wherein the ROSA further includes an optical receiver and a transimpedance amplifier (TIA) coupled to the post-amplifier, optical receiver and TIA not using a PCB to interconnect with other components of the computing device.

14. The computing device in accordance with claim 11, wherein the TOSA includes a laser driver that does not use a PCB to interconnect with other components of the computing device.

15. The computing device in accordance with claim 14, wherein the TOSA further includes an optical transmitter coupled to the laser driver and a sense photodiode coupled to the optical transmitter, the optical transmitter and sense photodiode not using a PCB to interconnect with other components of the computing device.

16. The computing device in accordance with claim 11, wherein the computing device is one of a 1 G laser transceiver, a 2 G laser transceiver, a 4 G laser transceiver, a 8 G laser transceiver, a 10 G laser transceiver, or a laser transceiver suitable for fiber optic links greater than 10 G.

17. The computing device in accordance with claim 11, wherein the computing device is one of a XFP laser transceiver, a SFP laser transceiver, or a SFF laser transceiver.

18. The optical transceiver IC in accordance with claim 1, wherein the electro-optic transducer driver of each cell is direct current coupled to the corresponding electro-optic transducer.

19. The optical transceiver IC in accordance with claim 1, each cell further comprising:

a TIA, the optoelectronic transducer being coupled to the post-amplifier via the TIA; and a sense photo-diode coupled to the electro-optic transducer for monitoring and coupled to at least one of the electro-optic transducer driver and the control module for providing monitoring information, wherein the TIA and the sense photo-diode of each cell are integrated with other components of the cell without the use of a PCB.

20. The optical transceiver IC in accordance with claim 1, each cell further including electrical interconnections that:

connect the post-amplifier with the optoelectronic transducer, connect the electro-optic transducer driver with the electro-optic transducer, and connect the control module with the electro-optic transducer driver and the post-amplifier, wherein the electrical interconnections are directly integrated onto the IC substrate by one or more semiconductor fabrication processes including at least one of a photo lithography process, an etching process, and a growth process.

21. A multiple cell optical transceiver comprising:

multiple optical transceiver cells optically isolated from each other optical transceiver cell and fabricated one on top of another in a single integrated circuit (IC), each cell including:

a post-amplifier configured for communication with an optoelectronic transducer;

an optoelectronic transducer coupled to the post-amplifier;

an electro-optic transducer driver configured for communication with an electro-optic transducer;

an electro-optic transducer coupled to the electro-optic transducer driver; and a control module configured to control operation of at least one of the post-amplifier and the electro-optic transducer driver, wherein the post-amplifier, the optoelectronic transducer, the electro-optic transducer driver, the electro-optic transducer, and the control module are integrated together without the use of a printed circuit board (PCB), and wherein the optoelectronic transducer of each cell is integrated on an IC substrate on which the cells of the IC are integrated and the electro-optic transducer of each cell is on a separate electro-optic transducer substrate mounted on the IC substrate.

22. The multiple cell optical transceiver in accordance with claim 21, each cell further comprising:

a trans-impendence amplifier (TIA), the optoelectronic transducer being coupled to the TIA and the TIA being coupled to the post-amplifier;

wherein the optoelectronic transducer and the TIA are integrated with the post-amplifier and the control module; and wherein the optoelectronic transducer and the TIA do not use a PCB for interconnections with other components in the cell and the interconnections between the post-amplifier, the TIA and the optoelectronic transducer of each cell are directly integrated onto the IC.

23. The multiple cell optical transceiver in accordance with claim 21, each cell further comprising:

a sense photo-diode on the electro-optic transducer substrate mounted on the IC substrate, the sense photo-diode being coupled to the electro-optic transducer for monitoring and coupled to at least one of the electro-optic transducer driver and the control module for providing monitoring information.

24. A multiple cell optical transceiver comprising:

multiple optical transceiver cells optically isolated from each other optical transceiver cell and fabricated one on top of another in a single integrated circuit (IC), each cell being optically isolated from each other cell with at least one cell being configured to operate at one bitrate and at least another cell being configured to operate an another, different bitrate, each cell including:

a post-amplifier configured for communication with an optoelectronic transducer;

an optoelectronic transducer coupled to the post-amplifier;

an electro-optic transducer driver configured for communication with an electro-optic transducer;

an electro-optic transducer coupled to the electro-optic transducer driver; and a control module configured to control operation of at least one of the post-amplifier and the electro-optic transducer driver, wherein the post-amplifier, the optoelectronic transducer, the electro-optic transducer driver, the electro-optic transducer, and the control module are integrated together without the use of a printed circuit board (PCB), and wherein the electro-optic transducer of each cell is integrated on an IC substrate on which the cells of the IC are integrated and the optoelectronic transducer of each cell is on a separate optoelectronic transducer substrate mounted on the IC substrate.

25. The multiple cell optical transceiver in accordance with claim 24, each cell further comprising:

a sense photodiode, the electro-optic transducer being coupled to the sense photodiode and the electro-optic transducer driver;

wherein the electro-optic transducer and the sense photodiode are integrated with the electro-optic transducer driver and the control module; and wherein the electro-optic transducer and the sense photodiode do not use a PCB for interconnections with other components in the cell and the interconnections between the electro-optic transducer driver, the electro-optic transducer, and the sense photodiode are directly integrated onto the IC.

26. The multiple cell optical transceiver in accordance with claim 24, each cell further comprising:

a TIA on the optoelectronic transducer substrate mounted on the IC substrate, the optoelectronic transducer being coupled to the post-amplifier via the TIA.

* * * * *